United States Patent
Wang et al.

(10) Patent No.: US 12,545,141 B2
(45) Date of Patent: Feb. 10, 2026

(54) METHOD AND SYSTEM FOR CONTROLLING BATTERY SWAPPING OPERATION BASED ON VEHICLE SIZE DETECTION

(71) Applicant: NIO TECHNOLOGY (ANHUI) CO., LTD, Hefei (CN)

(72) Inventors: Yifei Wang, Hefei (CN); Jiyong Zou, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 174 days.

(21) Appl. No.: 18/178,330

(22) Filed: Mar. 3, 2023

(65) Prior Publication Data

US 2023/0294549 A1    Sep. 21, 2023

(30) Foreign Application Priority Data

Mar. 18, 2022 (CN) .......................... 202210266549.X

(51) Int. Cl.
*B60L 53/80* (2019.01)
*B60L 53/30* (2019.01)
(Continued)

(52) U.S. Cl.
CPC .............. *B60L 53/80* (2019.02); *B60L 53/30* (2019.02); *B60W 30/06* (2013.01); *G06T 7/70* (2017.01); *G06T 2207/20084* (2013.01)

(58) Field of Classification Search
CPC .......... B60L 53/80; B60L 53/30; Y02T 10/70; Y02T 10/7072
See application file for complete search history.

(56) References Cited

U.S. PATENT DOCUMENTS 5,839,085 A * 11/1998 Yoshikawa ............ G08G 1/015 705/13
2014/0369798 A1 * 12/2014 Escande .................. B60L 53/80 414/584

(Continued)

FOREIGN PATENT DOCUMENTS

CN    104964662    10/2015
CN    105245510    1/2016

(Continued)

OTHER PUBLICATIONS

Official Action with Machine Translation for China Patent Application No. 202210266549.X, dated Apr. 25, 2022, 17 pages.

(Continued)

*Primary Examiner* — Toya Pettiegrew
(74) *Attorney, Agent, or Firm* — Sheridan Ross P.C.

(57) ABSTRACT

The disclosure relates to the field of electric vehicles, and more specifically, to a method for controlling a battery swapping operation based on vehicle size detection, a computer system for controlling a battery swapping operation based on vehicle size detection, a computer storage medium, and a battery swap station including the computer system. According to an aspect of the disclosure, the method for controlling a battery swapping operation based on vehicle size detection includes the following steps: in response to determining that a vehicle is in a predetermined battery swap region, enabling a ranging device arranged in a battery swap station; receiving measurement data from the ranging device after it is determined that the vehicle enters a ranging region; performing vehicle size detection based on the measurement data received from the ranging device; and controlling a battery swapping operation for the vehicle based on a detection result of the vehicle size detection.

19 Claims, 5 Drawing Sheets

(51) Int. Cl.
  *B60W 30/06* (2006.01)
  *G06T 7/70* (2017.01)

(56) References Cited

U.S. PATENT DOCUMENTS

2021/0245719 A1* 8/2021 Hall ..................... G07C 5/0808
2024/0083394 A1* 3/2024 Zhang ..................... B60S 5/06

FOREIGN PATENT DOCUMENTS

| CN | 109711274 | 5/2019 | |
|---|---|---|---|
| CN | 210174827 | 3/2020 | |
| CN | 111885143 | 11/2020 | |
| CN | 111885143 A * | 11/2020 | ............. H04L 67/12 |
| DE | 102009018180 | 10/2010 | |
| JP | H10-269489 | 10/1998 | |
| WO | WO 2018/154594 | 8/2018 | |
| WO | WO-2022143802 A1 * | 7/2022 | ............. G06F 18/00 |

OTHER PUBLICATIONS

Extended Search Report for European Patent Application No. 23157909.5, dated Aug. 24, 2023, 7 pages.

* cited by examiner

METHOD AND SYSTEM FOR CONTROLLING BATTERY SWAPPING OPERATION BASED ON VEHICLE SIZE DETECTION

CROSS-REFERENCE TO RELATED APPLICATIONS

This application claims the benefit of China Patent Application No. 202210266549.X filed Mar. 18, 2022, the entire contents of which are incorporated herein by reference in its entirety.

TECHNICAL FIELD

The disclosure relates to the field of electric vehicles, and more specifically, to a method for controlling a battery swapping operation based on vehicle size detection, a computer system for controlling a battery swapping operation based on vehicle size detection, a computer storage medium, and a battery swap station including the computer system.

BACKGROUND

At present, there are two main modes of energy supply for a battery electric vehicle: vehicle charging and battery replacement. In the vehicle charging mode, AC slow charging causes a long charging time and is limited by a parking place, while DC fast charging, though it shortens the charging time through a high power, has a great impact on a power grid and reduces the service life of the battery. In the battery replacement mode, the battery swap station can implement orderly charging by interacting with the power grid, and improve the comprehensive utilization efficiency of a power device, thereby quickly supplying energy to the electric vehicle, reducing waiting time of users, and not reducing the service life of the battery. Therefore, the battery replacement mode has high popularization value and economic significance in the urban public transportation field in China.

With the increasing intelligence degree of the battery swap station, the battery swap station has basically implemented automation and intelligence in many scenarios. However, the existing battery swap station lacks an ability of detecting whether a size of a vehicle entering the battery swap station meets a battery swapping requirement, and in particular, the vehicle may be equipped with extra-wide accessories (for example, an extra-wide pedal), extra-high accessories (for example, a roof box), and the like. Therefore, if the size of the vehicle entering the battery swap station is not detected, the vehicle equipped with extra-wide and extra-high accessories may cause damage to the vehicle and its accessories as well as facilities in the battery swap station in the process of entering the battery swap station.

BRIEF SUMMARY

In order to solve or at least alleviate one or more of the above problems, the following technical solutions are provided.

According to a first aspect of the disclosure, a method for controlling a battery swapping operation based on vehicle size detection is provided, including the following steps: in response to determining that a vehicle is in a predetermined battery swap region, enabling a ranging device arranged in a battery swap station; receiving measurement data from the ranging device after it is determined that the vehicle enters a ranging region; performing vehicle size detection based on the measurement data received from the ranging device; and controlling a battery swapping operation for the vehicle based on a detection result of the vehicle size detection.

According to the method for controlling a battery swapping operation based on vehicle size detection in an embodiment of the disclosure, where the vehicle is determined to be in the predetermined battery swap region in the following manners: using an image collection device arranged in the battery swap station to collect an image of the vehicle; using a convolutional neural network to process the collected image of the vehicle; and determining, based on a processing result of the convolutional neural network, that the vehicle is in the predetermined battery swap region.

According to the method for controlling a battery swapping operation based on vehicle size detection in an embodiment or any one of the above embodiments of the disclosure, where the method further includes: in response to not receiving the measurement data from the ranging device, instructing the vehicle to stop a parking operation; re-enabling the ranging device to receive the measurement data from the ranging device; and until the measurement data is received from the ranging device, instructing the vehicle to start the parking operation.

According to the method for controlling a battery swapping operation based on vehicle size detection in an embodiment or any one of the above embodiments of the disclosure, the performing vehicle size detection based on the measurement data received from the ranging device includes: performing vehicle width detection based on first measurement data from a first ranging device arranged in the battery swap station at a first height; and performing vehicle height detection based on second measurement data from a second ranging device arranged in the battery swap station at a second height.

According to the method for controlling a battery swapping operation based on vehicle size detection in an embodiment or any one of the above embodiments of the disclosure, the first height is greater than the second height.

According to the method for controlling a battery swapping operation based on vehicle size detection in an embodiment or any one of the above embodiments of the disclosure, the performing vehicle width detection based on first measurement data from a first ranging device arranged in the battery swap station at a first height includes: determining, based on the first measurement data, whether there is an object in a vehicle width detection region; and in response to detecting that there is an object in the vehicle width detection region, determining that the vehicle is extra-wide.

According to the method for controlling a battery swapping operation based on vehicle size detection in an embodiment or any one of the above embodiments of the disclosure, the performing vehicle height detection based on second measurement data from a second ranging device arranged in the battery swap station at a second height includes: determining, based on the second measurement data, whether there is an object in a vehicle height detection region; and in response to detecting that there is an object in the vehicle height detection region, determining that the vehicle is extra-high.

According to the method for controlling a battery swapping operation based on vehicle size detection in an embodiment or any one of the above embodiments of the disclosure, the controlling a battery swapping operation for the vehicle based on a detection result of the vehicle size detection includes: in response to determining that the vehicle is extra-wide and/or extra-high, instructing the vehicle to stop a parking operation; and sending a message indicating that the vehicle is extra-wide and/or extra-high to the vehicle.

According to the method for controlling a battery swapping operation based on vehicle size detection in an embodiment or any one of the above embodiments of the disclosure, it is determined, by using one or more of an image sensor, a position sensor, a pressure sensor, and an infrared sensor, that the vehicle enters the ranging region.

According to a second aspect of the disclosure, a computer system for controlling a battery swapping operation based on vehicle size detection is provided, including: a memory; a processor; and a computer program stored on the memory and executable on the processor, where the execution of the computer program causes the following steps to be performed: in response to determining that a vehicle is in a predetermined battery swap region, enabling a ranging device arranged in a battery swap station; receiving measurement data from the ranging device after it is determined that the vehicle enters a ranging region; performing vehicle size detection based on the measurement data received from the ranging device; and controlling a battery swapping operation for the vehicle based on a detection result of the vehicle size detection.

According to the system for controlling a battery swapping operation based on vehicle size detection in an embodiment of the disclosure, where the vehicle is determined to be in the predetermined battery swap region in the following manners: using an image collection device arranged in the battery swap station to collect an image of the vehicle; using a convolutional neural network to process the collected image of the vehicle; and determining, based on a processing result of the convolutional neural network, that the vehicle is in the predetermined battery swap region.

According to the system for controlling a battery swapping operation based on vehicle size detection in an embodiment or any one of the above embodiments of the disclosure, the execution of the computer program further causes the following steps to be performed: in response to not receiving the measurement data from the ranging device, instructing the vehicle to stop a parking operation; re-enabling the ranging device to receive the measurement data from the ranging device; and until the measurement data is received from the ranging device, instructing the vehicle to start the parking operation.

According to the system for controlling a battery swapping operation based on vehicle size detection in an embodiment or any one of the above embodiments of the disclosure, the performing vehicle size detection based on the measurement data received from the ranging device includes: performing vehicle width detection based on first measurement data from a first ranging device arranged in the battery swap station at a first height; and performing vehicle height detection based on second measurement data from a second ranging device arranged in the battery swap station at a second height.

According to the system for controlling a battery swapping operation based on vehicle size detection in an embodiment or any one of the above embodiments of the disclosure, the first height is greater than the second height.

According to the system for controlling a battery swapping operation based on vehicle size detection in an embodiment or any one of the above embodiments of the disclosure, the performing vehicle width detection based on first measurement data from a first ranging device arranged in the battery swap station at a first height includes: determining, based on the first measurement data, whether there is an object in a vehicle width detection region; and in response to detecting that there is an object in the vehicle width detection region, determining that the vehicle is extra-wide.

According to the system for controlling a battery swapping operation based on vehicle size detection in an embodiment or any one of the above embodiments of the disclosure, the performing vehicle height detection based on second measurement data from a second ranging device arranged in the battery swap station at a second height includes: determining, based on the second measurement data, whether there is an object in a vehicle height detection region; and in response to detecting that there is an object in the vehicle height detection region, determining that the vehicle is extra-high.

According to the system for controlling a battery swapping operation based on vehicle size detection in an embodiment or any one of the above embodiments of the disclosure, the controlling a battery swapping operation for the vehicle based on a detection result of the vehicle size detection includes: in response to determining that the vehicle is extra-wide and/or extra-high, instructing the vehicle to stop a parking operation; and sending a message indicating that the vehicle is extra-wide and/or extra-high to the vehicle.

According to the system for controlling a battery swapping operation based on vehicle size detection in an embodiment or any one of the above embodiments of the disclosure, it is determined, by using one or more of an image sensor, a position sensor, a pressure sensor, and an infrared sensor, that the vehicle enters the ranging region.

According to a third aspect of the disclosure, a computer storage medium is provided, including instructions, where when the instructions are run, the steps of the method for controlling a battery swapping operation based on vehicle size detection according to the first aspect of the disclosure are performed.

According to a fourth aspect of the disclosure, a battery swap station is provided, including the computer system for controlling a battery swapping operation based on vehicle size detection according to the second aspect of the disclosure.

According to the solution for controlling a battery swapping operation based on vehicle size detection in one or more embodiments of the disclosure, whether a size of the vehicle to be battery swapped that is about to enter the battery swap station meets a battery swapping requirement can be actively detected, so as to instruct the vehicle to stop the operation of being parked in the battery swap station when the size of the vehicle does not meet the battery swapping requirement, thereby preventing the vehicle equipped with extra-wide and extra-high accessories from causing damage to the vehicle and its accessories as well as facilities in the battery swap station in the process of entering the battery swap station. Therefore, effective battery swapping management of vehicles with different sizes is achieved, the risk of damage to the vehicle, its accessories, and facilities in the battery swap station is reduced, and the labor cost of the battery swap station is reduced while improving the battery swapping efficiency and user experience.

BRIEF DESCRIPTION OF THE SEVERAL VIEWS OF THE DRAWINGS

The above and other objectives and advantages of the disclosure will be clearer and more thorough from the following detailed description in conjunction with the drawings.

DETAILED DESCRIPTION

It should be noted that the terms such as "first" and "second" herein are intended to distinguish between similar objects, and do not necessarily describe a sequence of objects in terms of time, space, size, and the like. In addition, unless otherwise specified, the terms "including/comprising", "having", and similar expressions herein are intended to mean a non-exclusive inclusion.

The term "vehicle" or other similar terms in the specification are intended to indicate any suitable vehicle having a drive system including at least a battery, a power conversion device, and a drive motor, for example, a hybrid vehicle, an electric vehicle, a plug-in hybrid electric vehicle, and the like. The hybrid vehicle is a vehicle with two or more power sources, such as a vehicle powered by a gasoline engine and an electric motor. The term "battery swap station" in the specification refers to a place where a battery replacement service is provided for vehicles, and the place provides electric energy for the vehicles through battery replacement operations.

Various exemplary embodiments according to the disclosure will be described below in detail with reference to the accompanying drawings.

Figure 1:
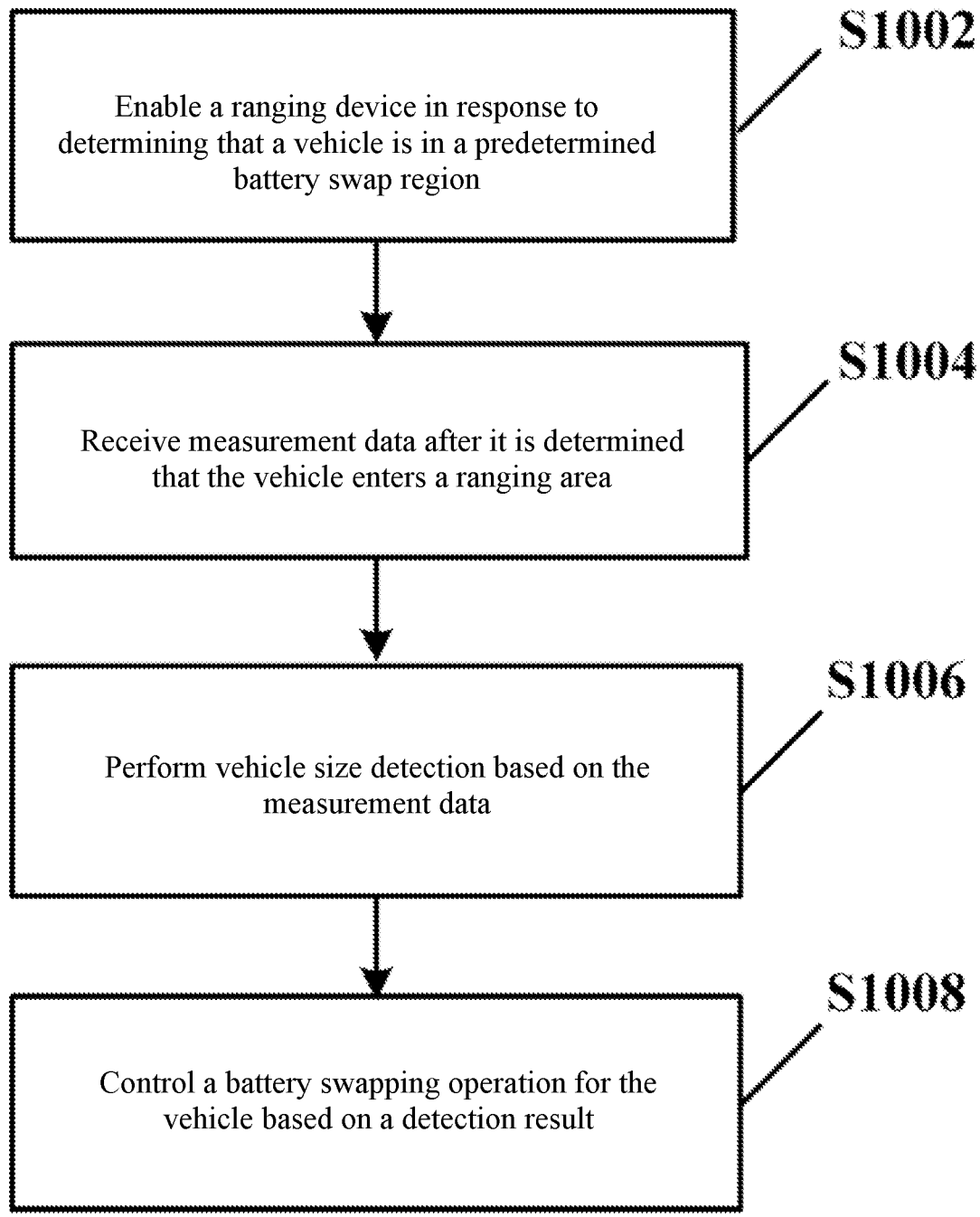
FIG. 1 is a flowchart of a method for controlling a battery swapping operation based on vehicle size detection according to one or more embodiments of the disclosure.
Figure 2A:
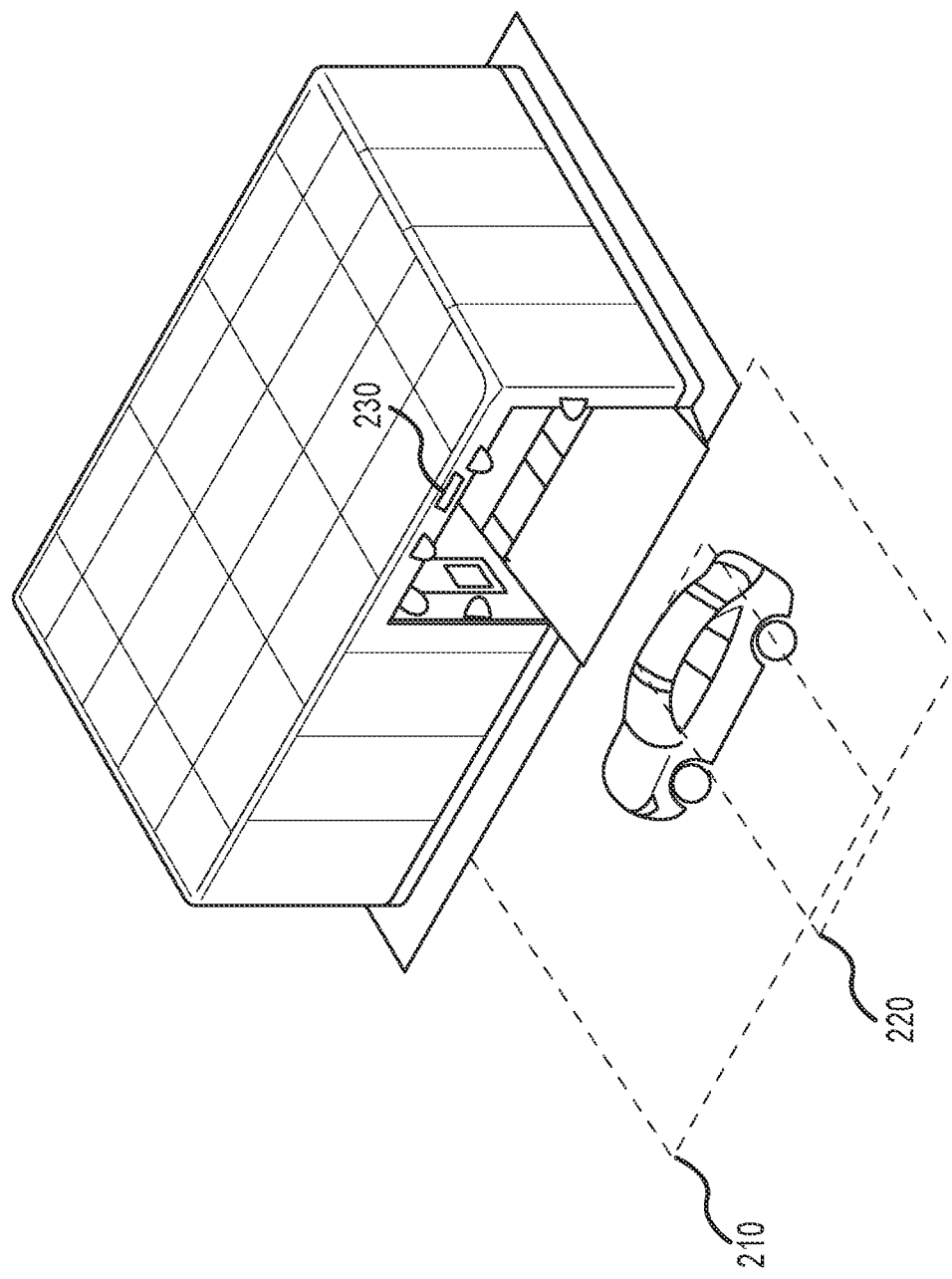
FIG. 2A to FIG. 2C are schematic diagrams of an image collection device and ranging devices arranged in a battery swap station according to one or more embodiments of the disclosure.
Figure 2B:
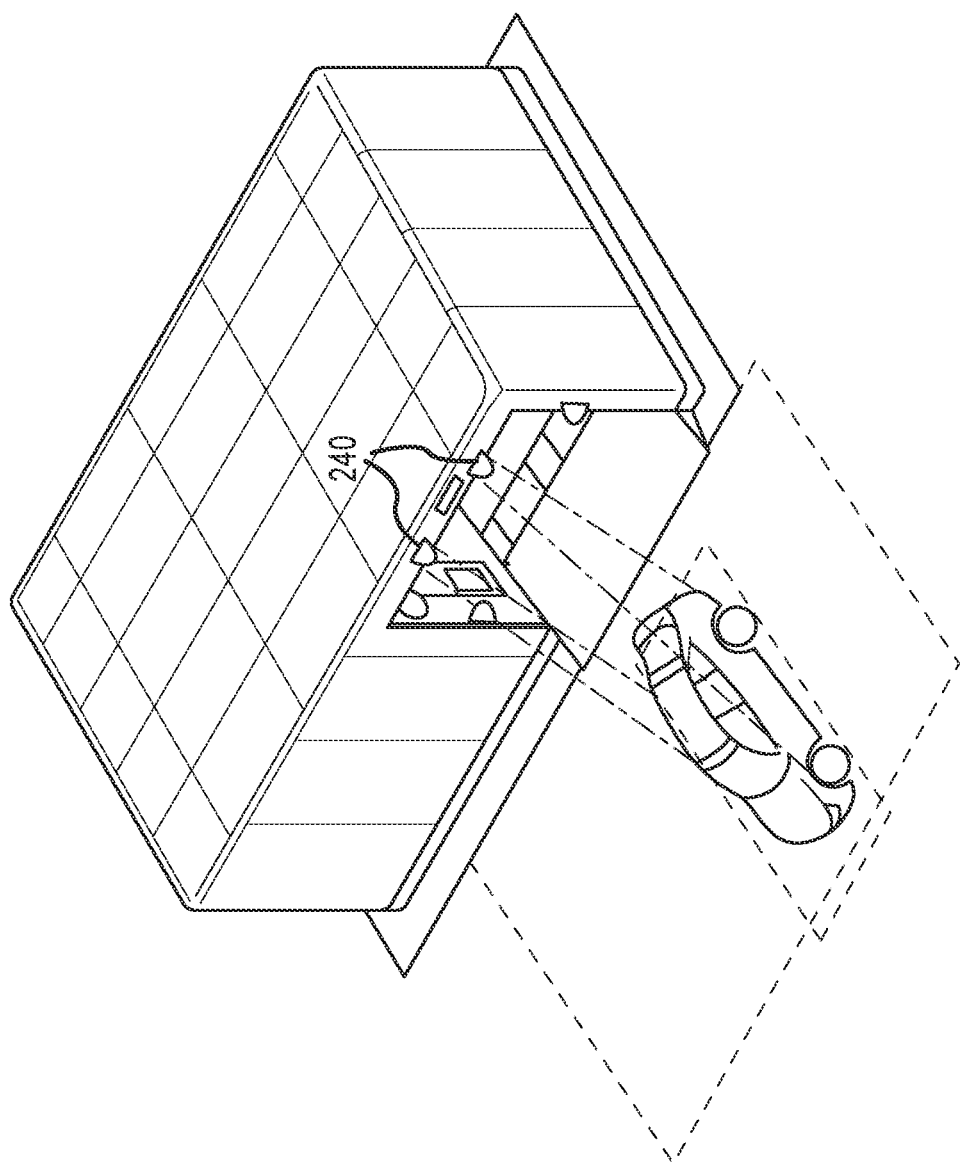
Figure 2C:
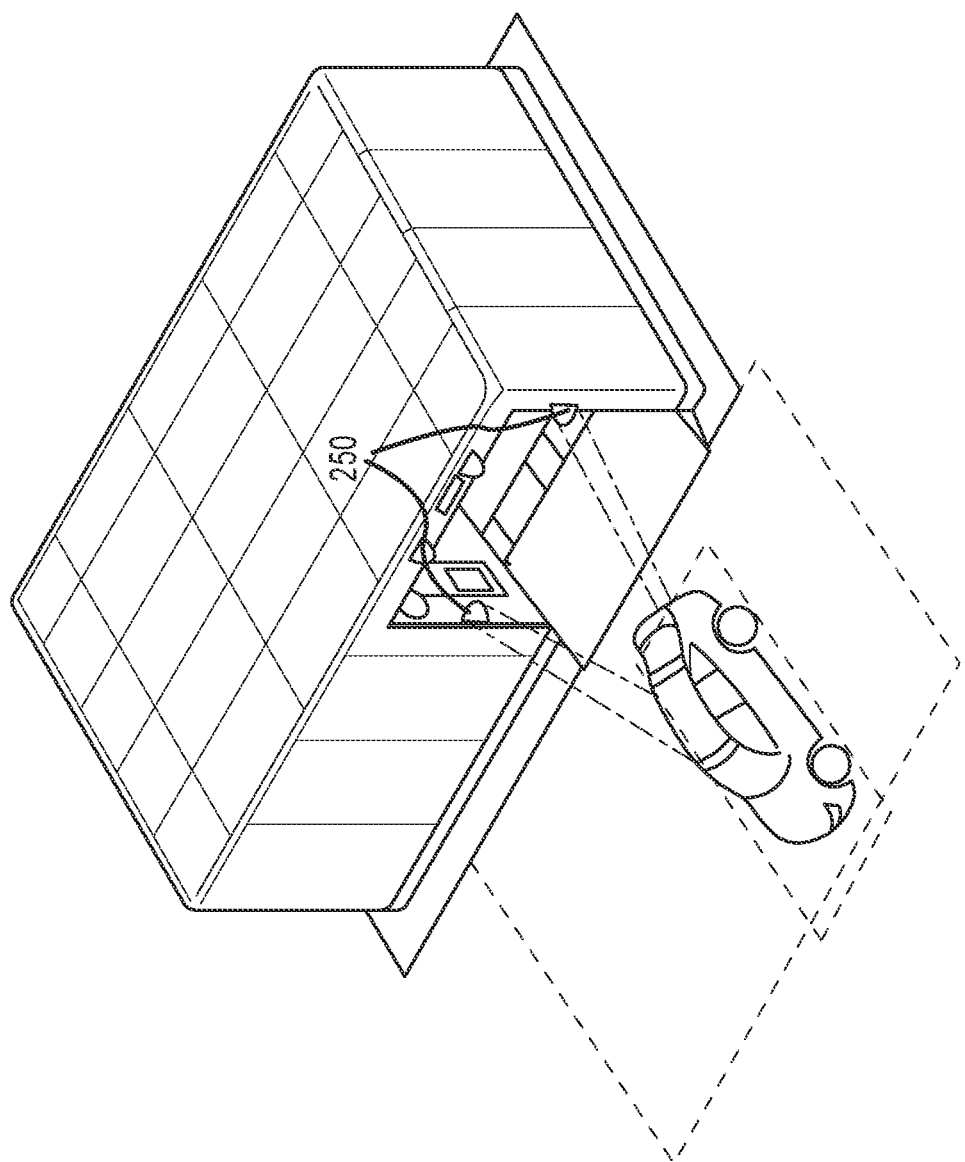

FIG. 1 is a flowchart of a method for controlling a battery swapping operation based on vehicle size detection according to one or more embodiments of the disclosure. FIG. 2A to FIG. 2C are schematic diagrams of an image collection device and ranging devices arranged in a battery swap station according to one or more embodiments of the disclosure. The method for controlling a battery swapping operation based on vehicle size detection according to one or more embodiments of the disclosure is described below in detail with reference to FIG. 1 and FIG. 2A to FIG. 2C.

As shown in FIG. 1, in step S1002, a ranging device arranged in a battery swap station is enabled in response to determining that a vehicle is in a predetermined battery swap region. Optionally, whether the vehicle to be battery swapped enters the predetermined battery swap region may be determined by using an image collection device and another processing module arranged in the battery swap station.

Exemplarily, the predetermined battery swap region may be a rectangular region (for example, it is 5 meters long and 3 meters wide) in front of the door of the battery swap station. Optionally, the shape and size of the predetermined battery swap region may be adjusted according to actual application scenarios and requirements. For example, referring to FIG. 2A below, the predetermined battery swap region 210 may be, for example, a substantially rectangular region located in front of the battery swap station, and an area of the region may be selected to be large enough to support operations such as the vehicle passing through the region, reversing, and parking in the station and the like. However, it should be understood that the area of the predetermined battery swap region cannot be selected to be too large such that an unexpected target (for example, a passing vehicle expected to have no battery swapping requirement, pedestrians, and the like) is collected by the image collection device and processed by another processing module, wasting computing resources in the battery swap station.

In an embodiment, referring to FIG. 2A below, the image collection device 230 may be arranged at the middle of the door head of the battery swap station, and may be configured to collect an image of the predetermined battery swap region 210 and determine, based on the collected image of the predetermined battery swap region 210, whether there is a vehicle entering the predetermined battery swap region 210. When there is a vehicle entering the predetermined battery swap region 210, the image collection device 230 collects an image containing the vehicle and performs proper operations such as coding and compression on the image to obtain image coding information, then the image coding information of the predetermined battery swap region 210 that contains the vehicle is transmitted to the processing module of the battery swap station, and the processing module determines, for example, based on a proper image coding comparison algorithm, that the vehicle enters the predetermined battery swap region 210.

In an embodiment, the image collection device herein may be implemented as a camera, which may be configured to take photos of the predetermined battery swap region, so as to obtain the photos of the predetermined battery swap region and further encode the obtained photos. In another embodiment, the image collection device may be implemented as a sensor, which may be configured to sense the predetermined battery swap region by using a sensor imaging technology and generate the image of the predetermined battery swap region by using the sensed data.

Optionally, one or more image collection devices (for example, cameras) arranged in the battery swap station may be used to collect an image of the vehicle and a convolutional neural network is used to process the collected image of the vehicle, to determine, based on a processing result of the convolutional neural network, whether the vehicle is in the predetermined battery swap region.

Exemplarily, the convolutional neural network may be defined as $\mathcal{N}$, the collected image of the vehicle is I, the image of the vehicle collected by using a first image collection device is $I_1$, and the image of the vehicle collected by using a second image collection device is $I_2$. If an inference result is defined as $\eta$, and a threshold used by the convolutional neural network is $\Delta$, the processing result of the convolutional neural network $\mathcal{N}$ may be defined as:

$$\mathcal{N}(I_1, I_2) = \eta; \quad \mathcal{N}(I_1, I_2) = \begin{cases} 1; \eta > \Delta \\ 0; \eta < \Delta \end{cases}$$

where $\mathcal{N}(I_1, I_2)=1$ indicates that the vehicle is in the predetermined battery swap region, and $\mathcal{N}(I_1, I_2)=0$ indicates that the vehicle is not in the predetermined battery swap region. Whether the vehicle is in the predetermined battery swap region is determined by one or more image collection devices arranged in the battery swap station, which can further improve the determining accuracy and reliability.

In one or more embodiments of the disclosure, the ranging device herein refers to a device capable of measuring a distance, and it may also be used together with an angle measuring device to measure parameters such as an angle, an area, and the like. Optionally, the ranging device may alternatively be implemented as a laser scanner, and the laser scanner is also referred to as a "line laser" by those skilled in the art, and may be configured to emit laser towards a ranging region, so as to perform uninterrupted ranging to obtain measurement data. In an embodiment, the laser scanner or the line laser may be configured to generate a two-dimensional laser beam and emit the laser beam in a predefined beam plane. Exemplarily, the laser scanner may be configured to emit laser towards the ranging region to detect a laser beam reflected by an object (for example, a vehicle to be battery swapped) in the ranging region, and can determine a distance between the ranging region (especially the object in the ranging region) and the laser scanner based on the reflected laser beam.

In step S1004, measurement data is received from the ranging device after it is determined that the vehicle enters a ranging region. Optionally, whether the vehicle enters the ranging region may be determined by using a sensing device arranged in the battery swap station. Exemplarily, the sensing device may include but is not limited to an image sensor, a position sensor, a pressure sensor, an infrared sensor, and the like. For example, the image sensor may be used to obtain image data of the ranging region, and determine, based on the image data in conjunction with a relevant image recognition algorithm, whether the vehicle enters the ranging region and a size of the vehicle part in the ranging region.

As an example, the determining that the vehicle enters the ranging region in step S1004 may alternatively be implemented by using the image collection device 230 and the processing module of the battery swap station described in step S1002 with reference to FIG. 2A.

After determining that the vehicle enters the ranging region, the measurement data is received from the ranging device. The ranging region herein refers to a region where vehicle size detection can be performed on the vehicle. In other words, whether the vehicle is extra-wide and/or extra-high may be determined based on the measurement data generated by the ranging device in the ranging region. Exemplarily, the ranging region may be selected as a region through which the vehicle parks into the battery swap station, for example, with reference to the ranging region 220 shown in FIG. 2A below.

In an embodiment, if the measurement data is not received from the ranging device, the vehicle is instructed to stop a parking operation, and the ranging device is re-enabled, so as to try to receive the measurement data from the ranging device again, and until the measurement data is received from the ranging device, the vehicle is instructed to start the parking operation again. For example, in some cases, the ranging device may fail to perform ranging on the ranging region, which may be caused by a failure in the ranging device itself, a failure in transmitting the ranging data, and other reasons. When the measurement data is not received from the ranging device, the battery swap station sends a notification of stopping parking to a vehicle that is being parked, and the ranging device is re-enabled for ranging until the ranging is successful. Therefore, the following case may be avoided: a vehicle with its size not meeting the battery swapping requirement enters the battery swap station due to a ranging failure, causing damage to the vehicle and its accessories as well as facilities in the battery swap station in the process where the vehicle equipped with extra-wide and extra-high accessories enters the battery swap station.

In step S1006, vehicle size detection is performed based on the measurement data received from the ranging device. Optionally, vehicle width detection may be performed based on first measurement data from a first ranging device arranged in the battery swap station at a first height, and vehicle height detection may be performed based on second measurement data from a second ranging device arranged in the battery swap station at a second height. Preferably, the first height may be greater than the second height. For example, FIG. 2B and FIG. 2C below respectively show a pair of ranging devices 240 arranged in the battery swap station at a first height and a pair of ranging devices 250 arranged in the battery swap station at a second height, where the first height is greater than the second height. Exemplarily, vehicle width detection may be performed based on measurement data from the pair of ranging devices 240, and vehicle height detection may be performed based on measurement data from the pair of ranging devices 250. The accuracy of vehicle size detection may be improved by performing vehicle size detection using the measurement data from the ranging devices arranged in the battery swap station at different heights.

Optionally, the performing vehicle width detection based on first measurement data from a first ranging device arranged in the battery swap station at a first height includes: determining, based on the first measurement data, whether there is an object in a vehicle width detection region; and in response to detecting that there is an object in the vehicle width detection region, determining that the vehicle is extra-wide. Optionally, the performing vehicle height detection based on second measurement data from a second ranging device arranged in the battery swap station at a second height includes: determining, based on the second measurement data, whether there is an object in a vehicle height detection region; and in response to detecting that there is an object in the vehicle height detection region, determining that the vehicle is extra-high.

Exemplarily, a vehicle width detection region and a vehicle height detection region may be determined based on a vehicle size, and may be adaptively selected according to a vehicle model and a type of the battery swap station.

In step S1008, a battery swapping operation for the vehicle is controlled based on a detection result of the vehicle size detection determined in step S1006. Optionally, the detection result of the vehicle size detection may include whether the vehicle is extra-wide or extra-high. If the detection result indicates that the vehicle is not extra-wide and not extra-high, the battery swap station may continue to guide the vehicle to be parked in the battery swap station. If the detection result indicates that the vehicle is extra-wide and/or extra-high, the battery swap station may instruct the vehicle to stop the parking operation and send a message indicating that the vehicle is extra-wide and/or extra-high to the vehicle, so as to avoid that the extra-wide and/or extra-high part of the vehicle collides and scratches an entrance of the battery swap station during the continuous parking of the vehicle in the battery swap station. In addition, the battery swap station may also notify the vehicle of the reason (for example, which part of the vehicle is extra-wide and/or extra-high) why the vehicle cannot be parked in the battery swap station, and guide the vehicle to leave the battery swap station.

According to the method for controlling a battery swapping operation based on vehicle size detection proposed in an aspect of the disclosure, whether the size of the vehicle to be battery swapped that is about to enter the battery swap station meets the battery swapping requirement can be actively detected, so that when the size of the vehicle does not meet the battery swapping requirement, the vehicle is instructed to stop the parking operation of entering the battery swap station, thereby preventing the vehicle equipped with extra-wide and extra-high accessories from causing damage to the vehicle and its accessories as well as facilities in the battery swap station in the process of entering the battery swap station. Therefore, effective battery swapping management of vehicles with different sizes is achieved, the risk of damage to the vehicle, its accessories, and facilities in the battery swap station is reduced, and the labor cost of the battery swap station is reduced while improving the battery swapping efficiency and user experience.

Figure 3:
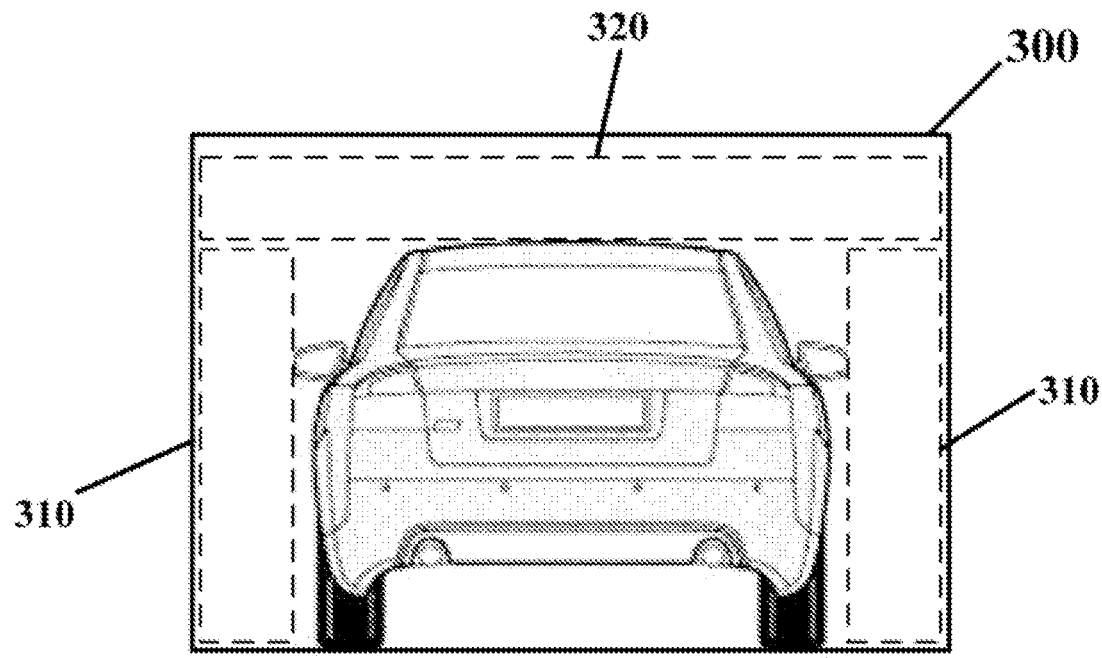
FIG. 3 is a schematic diagram of a vehicle height detection region and a vehicle width detection region according to one or more embodiments of the disclosure.

FIG. 3 is a schematic diagram of a vehicle height detection region and a vehicle width detection region according to one or more embodiments of the disclosure.

As shown in FIG. 3, a region 300 is a region where vehicle size detection is performed on a vehicle at positions around the top and both sides of the vehicle, and includes a vehicle width detection region 310 and a vehicle height detection region 320. Optionally, whether there is an object in the vehicle width detection region 310 may be detected based on ranging data from a first ranging device arranged in the battery swap station at a first height, and that the vehicle is extra-wide is determined in response to detecting that there is an object in the vehicle width detection region 310. Optionally, whether there is an object in the vehicle height detection region 320 may be detected based on ranging data from a second ranging device arranged in the battery swap station at a second height, and that the vehicle is extra-high is determined in response to detecting that there is an object in the vehicle height detection region 320. Exemplarily, with reference to FIG. 2B and FIG. 2C, whether there is an object in the vehicle width detection region 310 may be detected by using ranging data from a first ranging device 240, and that the vehicle is extra-wide is determined in response to detecting that there is an object in the vehicle width detection region 310. Whether there is an object in the vehicle height detection region 320 may be detected by using ranging data from a second ranging device 250, and that the vehicle is extra-high is determined in response to detecting that there is an object in the vehicle height detection region 320.

Figure 4:
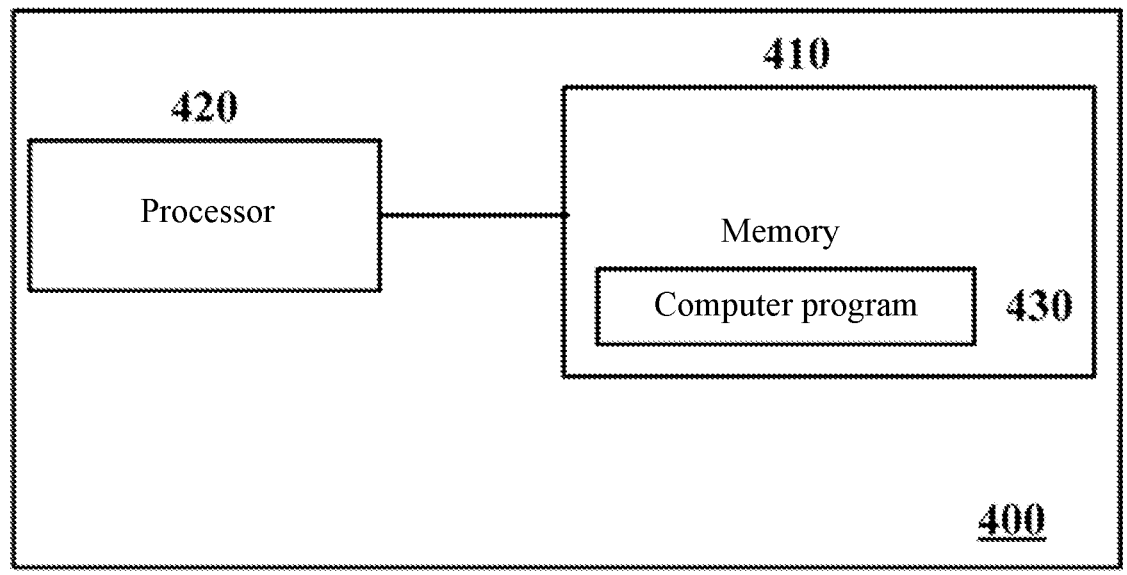
FIG. 4 is a schematic block diagram of a computer system for controlling a battery swapping operation based on vehicle size detection according to one or more embodiments of the disclosure.

FIG. 4 is a schematic block diagram of a computer system for controlling a battery swapping operation based on vehicle size detection according to one or more embodiments of the disclosure. As shown in FIG. 4, a computer system 400 includes a memory 410, a processor 420, and a computer program 430 stored on the memory 410 and executable on the processor 420. When the computer program 430 is executed by the processor 420, the steps of the method for controlling a battery swapping operation based on vehicle size detection as described above are implemented.

In addition, the disclosure may alternatively be implemented as a computer storage medium, which has stored therein a program for causing a computer to perform the method for controlling a battery swapping operation based on vehicle size detection according to an aspect of the disclosure.

Various forms of computer storage media, such as disks (for example, a magnetic disk, an optical disc, etc.), cards (for example, a memory card, an optical card, etc.), semiconductor memories (for example, a ROM, a non-volatile memory, etc.), and tapes (for example, a magnetic tape, a cassette tape, etc.) may be used as the computer storage medium.

In addition, as described above, the disclosure may also be implemented as a battery swap station, which may include the computer system for controlling a battery swapping operation based on vehicle size detection according to an aspect of the disclosure.

Various embodiments provided in the disclosure may be implemented by hardware, software, or a combination of hardware and software where applicable. In addition, without departing from the scope of the disclosure, various hardware components and/or software components described in this specification may be combined into a combined component including software, hardware, and/or both where applicable. Without departing from the scope of the disclosure, various hardware components and/or software components described in this specification may be separated into sub-components including software, hardware, or both where applicable. In addition, where applicable, it is contemplated that software components may be implemented as hardware components, and vice versa.

Software (such as program code and/or data) in the disclosure may be stored on one or more computer storage media. It is also contemplated that the software identified herein may be implemented using one or more general-purpose or special-purpose computers and/or computer systems, networked and/or otherwise. The steps described herein may be changed in order, combined into compound steps, and/or divided into sub-steps where applicable, to provide the features described herein.

The embodiments and examples proposed herein are provided to describe as adequately as possible embodiments according to the disclosure and specific applications thereof and thus enable those skilled in the art to implement and use the disclosure. However, those skilled in the art will know that the above descriptions and examples are provided only for description and illustration. The proposed description is not intended to cover all aspects of the disclosure or limit the disclosure to the disclosed precise forms.

What is claimed is:

1. A method for controlling a battery swapping operation based on vehicle size detection, comprising:
   in response to determining that a vehicle is in a predetermined battery swap region, enabling a ranging device arranged in a battery swap station;
   receiving measurement data from the ranging device after it is determined that the vehicle enters a ranging region;
   performing vehicle size detection based on the measurement data received from the ranging device; and
   controlling the battery swapping operation for the vehicle based on a detection result of the vehicle size detection.

2. The method according to claim 1, wherein the vehicle is determined to be in the predetermined battery swap region in the following manners:
   using an image collection device arranged in the battery swap station to collect an image of the vehicle;
   using a convolutional neural network to process the collected image of the vehicle; and
   determining, based on a processing result of the convolutional neural network, that the vehicle is in the predetermined battery swap region.

3. The method according to claim 1, further comprising:
   in response to not receiving the measurement data from the ranging device, instructing the vehicle to stop a parking operation;

re-enabling the ranging device to receive the measurement data from the ranging device; and until the measurement data is received from the ranging device, instructing the vehicle to start the parking operation.

4. The method according to claim 1, wherein the performing vehicle size detection based on the measurement data received from the ranging device comprises:

performing vehicle width detection based on first measurement data from a first ranging device arranged in the battery swap station at a first height; and performing vehicle height detection based on second measurement data from a second ranging device arranged in the battery swap station at a second height.

5. The method according to claim 4, wherein the first height is greater than the second height.

6. The method according to claim 4, wherein the performing vehicle width detection based on first measurement data from the first ranging device arranged in the battery swap station at the first height comprises:

determining, based on the first measurement data, whether there is an object in a vehicle width detection region; and in response to detecting that there is an object in the vehicle width detection region, determining that the vehicle is extra-wide.

7. The method according to claim 4, wherein the performing vehicle height detection based on second measurement data from the second ranging device arranged in the battery swap station at the second height comprises:

determining, based on the second measurement data, whether there is an object in a vehicle height detection region; and in response to detecting that there is an object in the vehicle height detection region, determining that the vehicle is extra-high.

8. The method according to claim 1, wherein the controlling the battery swapping operation for the vehicle based on the detection result of the vehicle size detection comprises:

in response to determining that the vehicle is extra-wide and/or extra-high, instructing the vehicle to stop the parking operation; and sending a message indicating that the vehicle is extra-wide and/or extra-high to the vehicle.

9. The method according to claim 1, wherein it is determined, by using one or more of an image sensor, a position sensor, a pressure sensor, and an infrared sensor, that the vehicle enters the ranging region.

10. A computer system for controlling a battery swapping operation based on vehicle size detection, comprising:

a memory;

a processor; and a computer program stored on the memory and executable on the processor, wherein the execution of the computer program causes the following steps to be performed:

in response to determining that a vehicle is in a predetermined battery swap region, enabling a ranging device arranged in a battery swap station;

receiving measurement data from the ranging device after it is determined that the vehicle enters a ranging region;

performing vehicle size detection based on the measurement data received from the ranging device; and controlling the battery swapping operation for the vehicle based on a detection result of the vehicle size detection.

11. The system according to claim 10, wherein the vehicle is determined to be in the predetermined battery swap region in the following manners:

using an image collection device arranged in the battery swap station to collect an image of the vehicle;

using a convolutional neural network to process the collected image of the vehicle; and determining, based on a processing result of the convolutional neural network, that the vehicle is in the predetermined battery swap region.

12. The system according to claim 10, wherein the execution of the computer program further causes the following steps to be performed:

in response to not receiving the measurement data from the ranging device, instructing the vehicle to stop the parking operation;

re-enabling the ranging device to receive the measurement data from the ranging device; and until the measurement data is received from the ranging device, instructing the vehicle to start the parking operation.

13. The system according to claim 10, wherein the performing vehicle size detection based on the measurement data received from the ranging device comprises:

performing vehicle width detection based on first measurement data from a first ranging device arranged in the battery swap station at a first height; and performing vehicle height detection based on second measurement data from a second ranging device arranged in the battery swap station at a second height.

14. The system according to claim 13, wherein the first height is greater than the second height.

15. The system according to claim 13, wherein the performing vehicle width detection based on first measurement data from the first ranging device arranged in the battery swap station at the first height comprises:

determining, based on the first measurement data, whether there is an object in a vehicle width detection region; and in response to detecting that there is an object in the vehicle width detection region, determining that the vehicle is extra-wide.

16. The system according to claim 13, wherein the performing vehicle height detection based on second measurement data from the second ranging device arranged in the battery swap station at the second height comprises:

determining, based on the second measurement data, whether there is an object in a vehicle height detection region; and in response to detecting that there is an object in the vehicle height detection region, determining that the vehicle is extra-high.

17. The system according to claim 10, wherein the controlling the battery swapping operation for the vehicle based on the detection result of the vehicle size detection comprises:

in response to determining that the vehicle is extra-wide and/or extra-high, instructing the vehicle to stop a parking operation; and sending a message indicating that the vehicle is extra-wide and/or extra-high to the vehicle.

18. The system according to claim 10, wherein it is determined, by using one or more of an image sensor, a position sensor, a pressure sensor, and an infrared sensor, that the vehicle enters the ranging region.

19. A non-transitory computer storage medium comprising instructions, wherein when the instructions are run, the method according to claim 1 is performed.

\* \* \* \* \*